United States Patent
Tsai

Patent Number: 5,820,114
Date of Patent: Oct. 13, 1998

[54] SHOCK ABSORBER

[76] Inventor: Chin-Sung Tsai, No. 2, Lane 371, Hwa Cheng Rd., Hsin Chuang City, Taipei Hsien, Taiwan

[21] Appl. No.: 803,462

[22] Filed: Feb. 20, 1997

[51] Int. Cl.$^6$ .............. B60G 13/00; F16F 3/10
[52] U.S. Cl. .......... 267/202; 188/321.11; 188/129; 188/381; 267/33
[58] Field of Search ............... 267/201, 202, 267/203, 33, 286, 292, 293, 294, 152, 153, 141.1, 134, 135, 131, 132, 64.12, 177, 219–220; 188/129, 381, 67, 281, 271, 300, 321.11; 213/33, 22, 26, 31; 16/337; 482/114, 121

[56] References Cited

U.S. PATENT DOCUMENTS

| | | | |
|---|---|---|---|
| 2,010,623 | 8/1935 | Bugatti | 267/203 |
| 2,265,392 | 12/1941 | Olander | 267/202 |
| 2,705,634 | 4/1955 | Sampson et al. | 267/203 |
| 2,844,366 | 7/1958 | Butterfield | 267/134 |
| 3,332,523 | 7/1967 | Chambers | 188/67 |
| 3,856,285 | 12/1974 | Yamada | 188/129 |
| 3,889,937 | 6/1975 | Statler | 267/202 |
| 4,415,146 | 11/1983 | Sitko | 267/202 |
| 4,457,497 | 7/1984 | Ojima | 188/129 |
| 4,613,114 | 9/1986 | Paton | 267/202 |
| 5,257,680 | 11/1993 | Corcoran et al. | 188/281 |

*Primary Examiner*—Douglas C. Butler
*Attorney, Agent, or Firm*—Heller Ehrman White & McAuliffe

[57] ABSTRACT

A shock absorber for a real wheel of a bicycle includes a body for connection to an axle of the wheel, a lower mounting member threadedly engaging around a circumferential periphery of the body, a first cushioning element made of urethane fixedly received in a cavity of the body, an upper mounting member for connection to a frame of the bicycle, a second cushioning element made of urethane mounted between the upper mounting member and the body, a rod having a top end fixedly connected to the upper mounting member and extending downwardly through the second and first cushioning elements, wherein the rod has an interference fit with the first and second cushioning elements, and a spring fixedly mounted between the upper and lower mounting members.

6 Claims, 4 Drawing Sheets

# SHOCK ABSORBER

FIELD OF THE INVENTION

The present invention is related to rear shock absorber, particularly to a rear shock absorber for a rear wheel of a bicycle.

BACKGROUND OF THE INVENTION

Bicycles are very common articles used for transportation or recreation (for example, riding of mountain bikes).

For mountain bikes, since they are often ridden on rugged paths, they are needed to be equipped with rear shock absorbers to absorb shock to rear wheels. Conventional rear shock absorbers, which only use springs as cushioning means, cannot effectively overcome the vibration caused by the rugged paths since the springs rebound to their original positions immediately after an impact acting thereon is released, which also is a source of the vibration. Although an improvement over the conventional rear shock absorbers to incorporate a hydraulic or pneumatic piston-cylinder mechanism can more effectively overcome the vibration, it has a disadvantage that the hydraulic or pneumatic piston-cylinder mechanism is expensive, breaks down easily and needs to be regularly maintained.

The present invention therefore is aimed to provide a rear shock absorber to mitigate and/or obviate the aforementioned problems.

SUMMARY OF THE INVENTION

An objective of the present invention is to provide a rear shock absorber which can effectively overcome the vibration come from a rear wheel of a bicycle equipped with the rear shock absorber, when the bicycle is ridden along a mountain trail or rugged path.

A still further objective of the present invention is to provide a rear shock absorber which has a simple structure and does not need a hydraulic/pneumatic cylinder so that the rear shock absorber can have a good reliability of operation and does lot to be regularly maintained.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
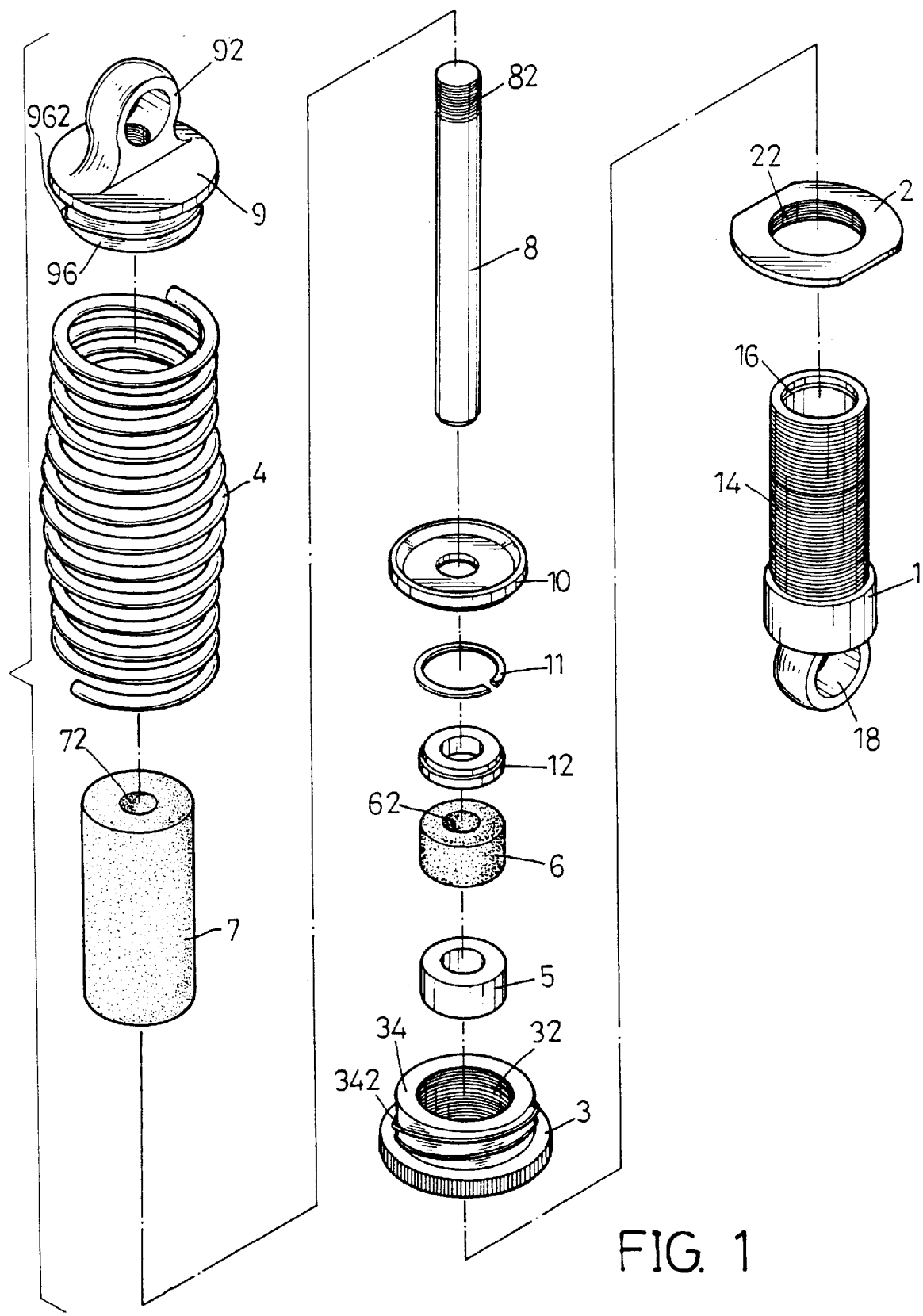
FIG. 1 is an exploded, perspective view showing a rear shock absorber for a bicycle in accordance with a first embodiment of the present invention.
Figure 2:
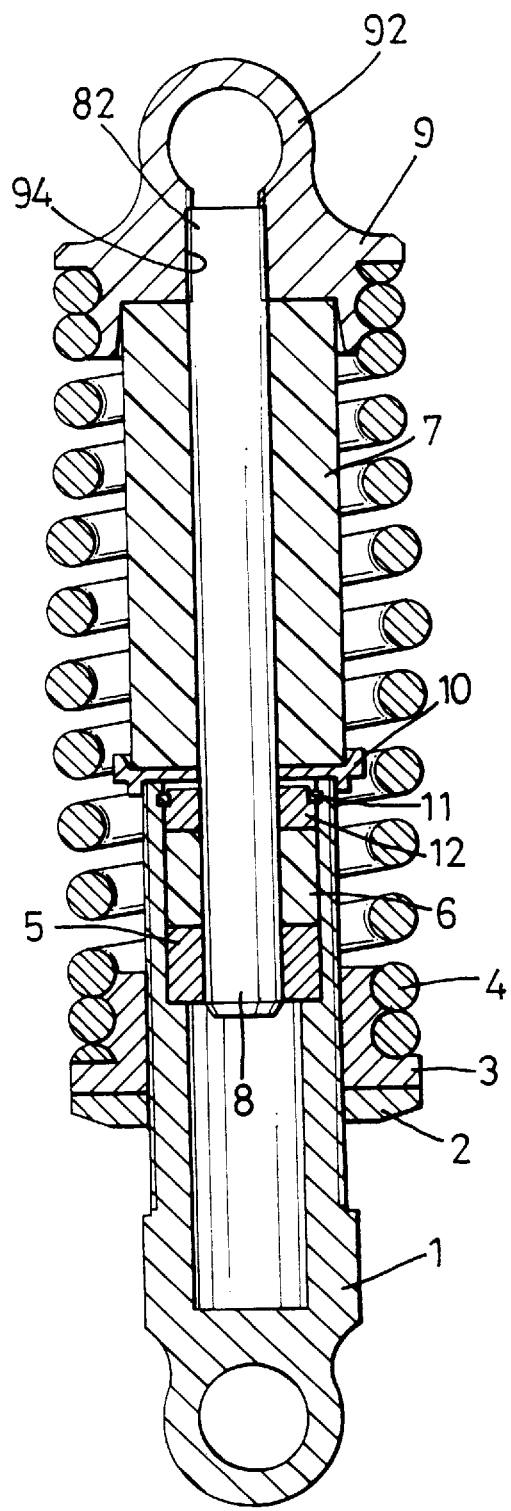
FIG. 2 is a cross-sectional view showing that the rear shock absorber in an assembled state, wherein the rear shock absorber is not subjected to any impact.
Figure 3:
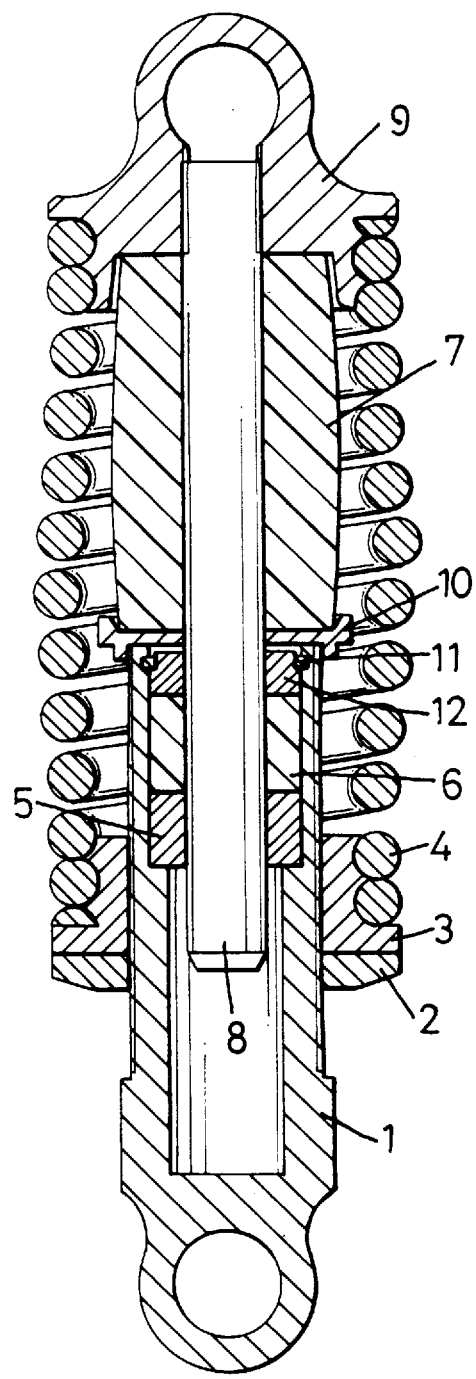
FIG. 3 is view similar to FIG. 2, but showing that the rear shock absorber is subjected to an impact.

Referring to FIGS. 1 to 3, a rear shock absorber for a bicycle in accordance with a first embodiment of the present invention includes a body 1, a positioning nut 2, a lower mounting member 3, a lower bearing element 5, a lower cushioning element 6 made of elastomeric material, preferably, foamed urethane, an upper bearing element 12, a retainer ring 11, a mounting disk 10, a rod 8, an upper cushioning element 7 made of foamed urethane, a spring 4 and an upper mounting member 9.

The upper mounting member 9 includes an upper lug 92 for connection to a part of a frame of the bicycle (for example, a seat tube), a first threaded hole 94 for threadedly engaging with an upper end 82 of the rod 8 which has a corresponding thread formed thereon and a lower extension 96 formed with ridge 962 for engaging with a top end of the spring 4. The spring 4 has upper and lower portions which have a diameter smaller than that of a central portion thereof. The upper cushioning element 7 defines a first central hole 72 which has a diameter slightly smaller than that of the rod 8. The upper cushioning element 7 has an outer diameter smaller than a smaller diameter of two inner diameters of the spring 4. The rod 8 is mounted to extend through the upper cushioning element 7, the mounting disk 10, the upper bearing element 12, the lower cushioning element 6 and the lower bearing element 5 to enter the body 1, wherein the mounting disk 10 and the upper and lower bearing elements 12 and 5 each have a central hole matingly fitted with the rod 8 while the lower cushioning element 6, like the upper cushioning element 7, has a second central hole 62 with a diameter slightly smaller than the outer diameter of the rod 8. The upper cushioning element 7 is mounted between the upper mounting member 9 and the mounting disk 10 and positioned inside the spring 4. The lower bearing element 5, the lower cushioning element 6 and the upper bearing element 12 are mounted in a cavity (not labeled) defined in an upper portion of the body 1 and retained in place by the retainer ring 11, which is received in a groove 16 defined around a top of the cavity of the body 1. The body 1 further has a lower lug 18 for connection to an axle of a rear wheel of the bicycle. The positioning nut 2 defines a second threaded hole 22 threadedly engaging with a threaded circumferential periphery 14 of the body 1 and located at an appropriate position. The lower mounting member 3 defines a third threaded hole 32 engaging with the threaded circumferential periphery 14 of the body 1 and abuts a top face of the positioning nut 2. The lower mounting member 3 further defines an upper extension 34 formed with ridges 342 for engaging with a lower end of the spring 4. The mounting disk 10 is located at a top of the body 1, wherein the upper cushioning element 7 is mounted between the upper mounting member 9 and the mounting disk 10.

When the spring 4 begins to rebound to its original position after it is released from a compressed state due to an impact acting thereon, the rebounding force of the spring 4 will firstly be damped by friction between the lower cushioning element 6 and the rod 8 and then damped by friction between the upper cushioning element 7 and the rod 8, whereby a vibration generated by the rebounding of the spring 4 can be effectively reduced so that the present invention can more effectively overcome the vibration of the rear wheel of the bicycle than those prior art bicycle shock absorbers which only use a spring as a shock absorbing means. Furthermore, since the present invention does not need use the sophisticated parts of a hydraulic or pneumatic piston-cylinder mechanism, the present invention has a very good reliability of operation and is almost maintenance free.

Figure 4:
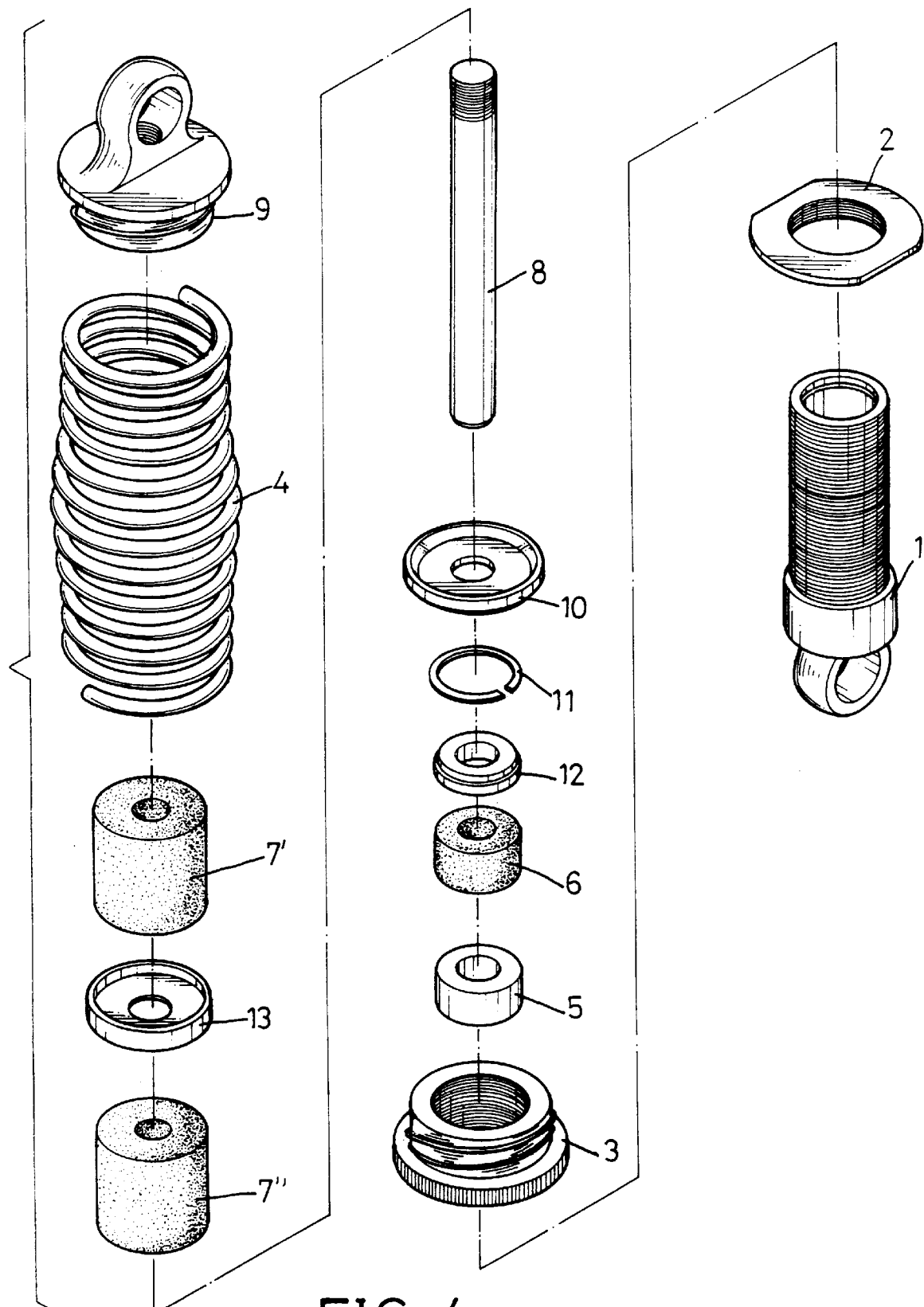
FIG. 4 is a view similar to FIG. 1, but showing a rear shock absorber in accordance with a second embodiment of the present invention.

FIG. 4 shows a rear shock absorber for a bicycle in accordance with a second embodiment of the present invention. The difference of the second embodiment over the first embodiment is in that the upper cushioning element 7 of the first embodiment is divided into a first and second sections 7' and 7" and has an additional cushioning mounting disk 13 for mounting the first cushioning section 7'. In the second embodiment, when the spring 4 begins to rebound to its original position after it is released from a compressed state due to an impact acting thereon, the rebounding force of the spring 4 will firstly be damped by friction between the lower cushioning element 6 and the rod 8 and then be damped by friction between the second cushioning element 7" and the rod 8 and finally damped by friction between the first cushioning element 7' and the rod 8, whereby a vibration generated by the rebounding of the spring 4 can be effectively reduced. Since the second embodiment damps the rebounding force of the spring 4 by three stages, it can more effectively cushion vibration of the rear wheel than the first embodiment.

Although the present invention is disclosed to be used as a rear shock absorber for a rear wheel of a bicycle, it is to be understood that the present invention can also be used to cushion a front wheel of the bicycle and other types of vehicle, for example, motorcycles or cars.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A shock absorber for a wheel of a vehicle, comprising:
    a body defining a lower lug adapted to be connected to an axle of the wheel and a cavity in an upper portion thereof;
    a first cushioning element made of elastomeric material and fixedly received in the cavity and defining a first hole having a first diameter;
    a second cushioning element made of elastomeric material and fixedly mounted on the body and defining a second hole having a second diameter the same as the first diameter;
    an upper mounting member defining an upper lug adapted to be connected to a part of a frame of the vehicle;
    a rod having an upper end fixedly attached to the upper mounting member and extending downwardly through the second and first elastomeric elements, wherein the rod has a third diameter slightly larger than the first and second diameters;
    a lower mounting member fixedly attached to a circumferential periphery of the body; and
    a spring having an upper end fixedly engaged with the upper mounting member and a lower end fixedly engaged with the lower mounting member.

2. The shock absorber in accordance with claim 1, wherein both the elastomeric material for forming the first and second cushioning elements is urethane.

3. The shock absorber in accordance with claim 1 further comprising a first and second bearing elements received in the cavity and located respectively below and above the first cushioning element, wherein the rod fittedly extends through the first, second bearing elements and the first and second bearing elements and the first elastomeric element are fixedly received in the cavity by a retainer ring being received in a groove defined around a top of the cavity.

4. The shock absorber in accordance with claim 1 further comprising a mounting disk positioned on a top of the body, wherein the second cushioning element is mounted between the mounting disk and the upper mounting member.

5. The shock absorber in accordance with claim 1 further comprising a positioning nut threadedly engaging the circumferential periphery of the body, wherein the lower mounting member abuts a top face of the positioning nut.

6. The shock absorber in accordance with claim 1, wherein the second cushioning element is composed of a plurality of individual sections.

\* \* \* \* \*